US008830506B2

(12) United States Patent
Hayakawa

(10) Patent No.: US 8,830,506 B2
(45) Date of Patent: Sep. 9, 2014

(54) IMAGE PROCESSING SYSTEM UTILIZING PLURAL PARALLEL PROCESSORS AND IMAGE PROCESSING METHOD UTILIZING PLURAL PARALLEL PROCESSORS

(75) Inventor: Michio Hayakawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 358 days.

(21) Appl. No.: 13/198,132

(22) Filed: Aug. 4, 2011

(65) Prior Publication Data
US 2012/0243032 A1 Sep. 27, 2012

(30) Foreign Application Priority Data
Mar. 24, 2011 (JP) .................................. 2011-066654

(51) Int. Cl.
*G06F 3/12* (2006.01)
*G06K 15/02* (2006.01)

(52) U.S. Cl.
CPC .......... *G06K 15/1857* (2013.01); *G06F 3/1288* (2013.01); *G06F 3/124* (2013.01); *G06F 3/1215* (2013.01); *G06F 3/1247* (2013.01); *G06F 3/1243* (2013.01); *G06K 15/1859* (2013.01); *G06K 15/1849* (2013.01)
USPC .......... 358/1.15; 358/1.9; 358/1.18; 358/1.1; 358/1.13; 382/304; 345/505

(58) Field of Classification Search
USPC ................. 358/1.15, 1.9, 1.18, 1.1, 1.13, 2.1; 382/304; 345/505
See application file for complete search history.

(56) References Cited

U.S. PATENT DOCUMENTS

| 5,157,765 | A | 10/1992 | Birk et al. |
| 5,548,390 | A | 8/1996 | Sugisaki et al. |
| 7,072,052 | B1 * | 7/2006 | Tanahashi et al. ............. 358/1.1 |
| 2002/0171871 | A1 * | 11/2002 | Catt et al. .................... 358/1.18 |
| 2004/0070783 | A1 | 4/2004 | Yasuda |
| 2007/0064276 | A1 | 3/2007 | Park et al. |

(Continued)

FOREIGN PATENT DOCUMENTS

| EP | 0 432 896 A2 | 6/1991 |
| EP | 1 167 022 A1 | 1/2002 |

(Continued)

OTHER PUBLICATIONS

Nov. 23, 2012 Extended European Search Report issued in European Patent Application No. 10155079.6.

(Continued)

*Primary Examiner* — Jacky X Zheng
(74) *Attorney, Agent, or Firm* — Oliff PLC

(57) ABSTRACT

An image processing system includes intermediate-data generating apparatuses and one or more drawing-data generating apparatuses. The intermediate-data generating apparatuses interpret data of pages forming PDL document data, the pages being assigned to the corresponding intermediate-data generating apparatuses, to generate elements of intermediate data of the pages. The drawing-data generating apparatuses each obtain assigned elements of the intermediate data and each draw the obtained elements to generate drawing data including information concerning pixels forming each obtained element. The drawing-data generating apparatuses each include a memory that stores intermediate data or drawing data of a common element used in the obtained elements. If the intermediate data or the drawing data of the common element is stored in the memory, the drawing-data generating apparatuses generate drawing data of the obtained elements using the stored intermediate data or drawing data. The number of drawing-data generating apparatuses is smaller than that of intermediate-data generating apparatuses.

16 Claims, 10 Drawing Sheets

(56) References Cited

U.S. PATENT DOCUMENTS

| | | | |
|---|---|---|---|
| 2008/0084572 A1 | 4/2008 | Capper et al. | |
| 2008/0259392 A1* | 10/2008 | Tokumoto | 358/1.15 |
| 2009/0153892 A1* | 6/2009 | Torii | 358/1.13 |
| 2009/0251718 A1* | 10/2009 | Khain | 358/1.15 |

FOREIGN PATENT DOCUMENTS

| | | |
|---|---|---|
| JP | U-60-42791 | 3/1985 |
| JP | A-07-168681 | 7/1995 |
| JP | A-7-237336 | 9/1995 |
| JP | A-7-251543 | 10/1995 |
| JP | A-10-058770 | 3/1998 |
| JP | A-11-170656 | 6/1999 |
| JP | A-2000-335022 | 12/2000 |
| JP | A-2001-134389 | 5/2001 |
| JP | B2-3211417 | 7/2001 |
| JP | A-2003-125188 | 4/2003 |
| JP | B2-3488157 | 10/2003 |
| JP | A-2004-192390 | 7/2004 |
| JP | A-2006-297672 | 11/2006 |
| JP | A-2008-117379 | 5/2008 |
| JP | A-2011-25422 | 2/2011 |

OTHER PUBLICATIONS

Apr. 16, 2013 Office Action issued in U.S. Appl. No. 13/224,846.
U.S. Appl. No. 13/224,846 in the name of Hayakawa filed Sep. 2, 2011.
U.S. Appl. No. 12/714,018 in the name of Hayakawa filed Feb. 26, 2010.
Mar. 4, 2013 Office Action issued in U.S. Appl. No. 12/714,018.
Aug. 1, 2013 Office Action issued in U.S. Appl. No. 12/714,018.
Apr. 22, 2014 Notification of Reason for Refusal issued in Japanese Application No. 2011-066654 (with English Translation).

* cited by examiner

IMAGE PROCESSING SYSTEM UTILIZING PLURAL PARALLEL PROCESSORS AND IMAGE PROCESSING METHOD UTILIZING PLURAL PARALLEL PROCESSORS

CROSS-REFERENCE TO RELATED APPLICATIONS

This application is based on and claims priority under 35 USC 119 from Japanese Patent Application No. 2011-066654 filed Mar. 24, 2011.

BACKGROUND (i) Technical Field

The present invention relates to image processing systems and image processing methods.

(ii) Related Art

Technologies for processing print data in parallel by using plural raster image processors (RIPs) in order to speed up printing are known. A RIP is a device for converting data described in a page description language (PDL), such as PostScript (registered), into raster data that can be printed or displayed.

The following type of image processing system is also known. When a common element (e.g., a standard form) which is included in images of plural pages is received for the first time, raster data of the common element is produced and is stored in a cache memory. Then, when a page using the same standard form is to be processed, the produced raster data is reused.

SUMMARY

According to an aspect of the invention, there is provided an image processing system including plural intermediate-data generating apparatuses and one or more drawing-data generating apparatuses. The plural intermediate-data generating apparatuses interpret data of pages forming document data described in a page description language, the pages being assigned to the corresponding intermediate-data generating apparatuses, so as to generate plural elements of intermediate data of the pages. The one or more drawing-data generating apparatuses each obtain, among the plural elements of intermediate data generated by the plural intermediate-data generating apparatuses, elements of the intermediate data assigned to each of the one or more drawing-data generating apparatuses and that each draw the obtained elements of the intermediate data so as to generate drawing data including information concerning each of pixels forming each of the obtained elements of the intermediate data. The one or more drawing-data generating apparatuses each include a memory that stores intermediate data of a common element used in the obtained elements of the intermediate data assigned to the one or more drawing-data generating apparatuses or stores drawing data of the common element generated from the intermediate data of the common element. If the intermediate data or the drawing data of the common element used in the obtained elements of the intermediate data assigned to the one or more drawing-data generating apparatuses is stored in the memory, the one or more drawing-data generating apparatuses generate drawing data of the obtained elements of the intermediate data assigned to the one or more drawing-data generating apparatuses by using the intermediate data or the drawing data of the common element stored in the memory. The number of the one or more drawing-data generating apparatuses is smaller than the number of the plural intermediate-data generating apparatuses.

BRIEF DESCRIPTION OF THE DRAWINGS

Exemplary embodiment(s) of the present invention will be described in detail based on the following figures, wherein.

DETAILED DESCRIPTION

Figure 1:
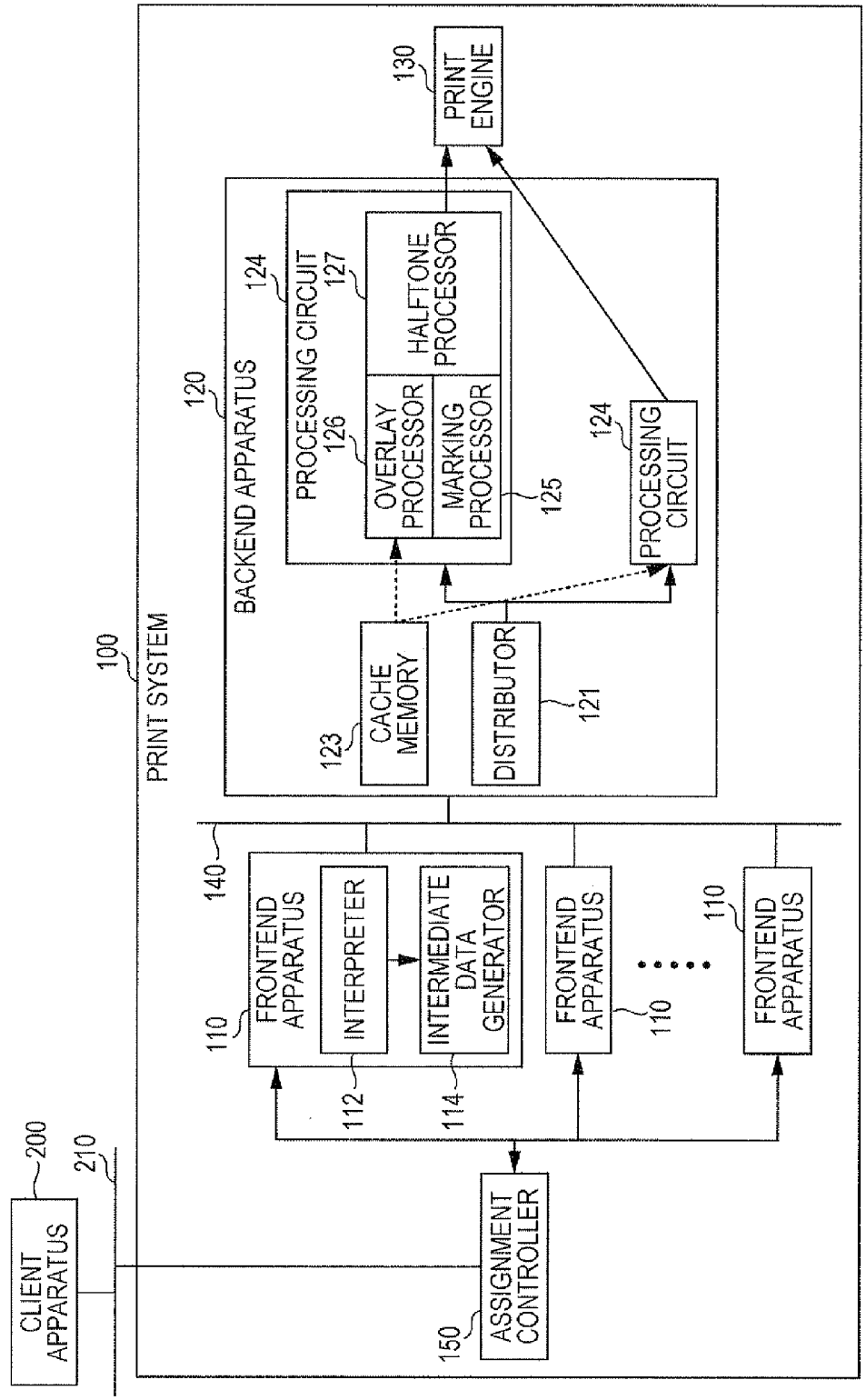
FIG. 1 is a functional block diagram illustrating a print system according to an exemplary embodiment of the present invention.

An exemplary embodiment of the invention will be described below with reference to the drawings.

A print system 100 of this exemplary embodiment includes plural frontend apparatuses 110, a backend apparatus 120, a print engine 130, and an assignment controller 150.

The assignment controller 150 assigns pages to the plural frontend apparatuses 110 in order to perform parallel processing in units of pages. More specifically, upon receiving PDL print data from a client apparatus 200 via a local area network (LAN) 210, the assignment controller 150 first transfers the print data to each frontend apparatus 110, and then, assigns processing tasks of pages of the print data to the corresponding frontend apparatuses 110 starting from the first page. In this case, the pages may be assigned to the frontend apparatuses 110 in a predetermined fixed order. Alternatively, every time a frontend apparatus 110 finishes processing the assigned page, it may report the completion of processing to the assignment controller 150, and in accordance with this report, the assignment controller 150 may assign an unprocessed first page to the frontend apparatus 110 that has reported the completion of processing. Those approaches to assigning pages are examples only, and pages may be assigned in other ways.

The assignment controller 150 may be contained (for example, installed as a program) in one of the frontend apparatuses 110, or may be constructed on a computer different from the frontend apparatuses 110 or the backend apparatus 120.

Each frontend apparatus 110 receives a print command including print data described in a PDL from the assignment controller 150 and converts the print data into intermediate data. The frontend apparatus 110 includes an interpreter 112 and an intermediate data generator 114. The interpreter 112 sequentially interprets the print data from the head. The intermediate data generator 114 generates intermediate data from the interpretation results sequentially output from the interpreter 112. The intermediate data is, for example, a so-called display list. The intermediate data may be generated in units of pages or in units of bands, each band being represented by the predetermined number of scanning lines. Alternatively, the intermediate data may be interval data which partitions each object, which is an image element forming an image of a page, (e.g., character fonts, graphics, and image data), in units of raster scanning lines. This interval data indicates an interval in which an object occupies one scanning line. The interval data may be represented by a pair of coordinates positioned at both ends of the interval, and may include information that defines the pixel values of pixels contained in the interval. The pixel values are density values (gray levels) of each of the basic colors, such as yellow (Y), magenta (M), cyan (C), and black (K), used by the print engine 130. The intermediate data may be data other than a display list or interval data, and may be a data format for which the amount of data is an amount between that of the PDL and that of a bitmap image (raster image). The intermediate data described below may be an individual display list or an individual element of interval data, or a set of plural display lists or plural elements of interval data, which represent a drawing unit, such as a page or a band obtained by dividing a page.

More specifically, the interpreter 112 of each frontend apparatus 110 sequentially interprets PDL print data from the head received from the assignment controller 150. The interpreter 112 interprets not only a page assigned to the frontend processor 110 including this interpreter 112, but also all the pages. This is because a case where the print data may be described in a page-dependent PDL is assumed. In the page-dependent PDL, a change in the internal state of the interpreter 112 due to the interpretation of and execution of commands performed in the previous page influences the interpretation of the subsequent page. By using, among the interpretation results output from the interpreter 112, the interpretation result (and the internal state of the interpreter 112) concerning a page assigned to the frontend apparatus 110 by using the assignment controller 150, the intermediate data generator 114 generates intermediate data formed by primitive data (individual commands forming a display list or interval data) concerning each object within a page. The intermediate data may be generated in units of pages or in units of bands, each band being represented by a predetermined number of scanning lines.

In most cases, the interpretation of a PDL and conversion of a PDL into intermediate data is implemented by software processing. In this example, since each frontend apparatus 110 converts a PDL into intermediate data only for a page assigned to the frontend apparatus 110, the advantage of parallel processing is enhanced.

If print data is described in a page-independent PDL, the assignment controller 150 may divide the print data into pages and may assign a page to each frontend apparatus 110.

If the print data is described in a page-dependent PDL, the assignment controller 150 may interpret the print data and convert it into data of a page-independent PDL, and then, may divide the converted data into pages and may assign a page to each frontend apparatus 110.

In either case, each frontend apparatus 110 generates intermediate data concerning a page assigned by using the assignment controller 150 and transfers the generated intermediate data to the single backend apparatus 120 via a transmission channel 140, such as a LAN or a communication cable.

Accordingly, in the example shown in FIG. 1, plural elements of intermediate data of plural pages generated by the plural frontend apparatuses 110 in parallel are sent to the single backend apparatus 120.

The backend apparatus 120 converts the intermediate data generated by the frontend apparatuses 110 into raster-scan image data (for example, raster image or bitmap image) which can be handled by the print engine 130, and then supplies the image data to the print engine 130. The backend apparatus 120 shown in FIG. 1 includes a distributor 121, a cache memory 123, and plural processing circuits 124. The distributor 121 distributes elements of intermediate data of the individual pages input from the plural frontend apparatuses 110 over the plural processing circuits 124. The intermediate data may be distributed in a predetermined unit, such as a page or a band represented by a predetermined number of scanning lines obtained by dividing a page, or a portion separated from a page or a band in accordance with each of the basic colors (e.g., Y, M, C, and K) of the print engine 130. Hereinafter, it is assumed that the intermediate data is divided in units of pages, which is a typical example.

The plural processing circuits 124 process the distributed intermediate data by parallel processing. Each processing circuit 124 includes a marking processor 125, an overlay processor 126, and a halftone processor 127. The marking processor 125 processes the intermediate data so as to form image data in a drawing memory, such as a page buffer or a band buffer. The overlay processor 126 superposes or composites image data of elements other than a common element which is used for plural portions (e.g., plural pages) of the print data on or with image data of the common element. The common element may include common objects (graphics, diagrams, characters, images, etc.) in plural pages. The common element may be an object, such as border lines defining a format of a document, a mark (e.g., a logo mark) representing a company or a group that has created the document, or a character string (e.g., "important", "for internal use only", or "classified") indicating the type of document or the level of confidentiality. Such objects may appear in common in plural pages of the document. In PostScript (registered), objects, such as forms, representing such a common element, are available. The halftone processor 127 performs halftone processing on the image data generated by the marking processor 125 or on image data obtained by superposing or compositing the image data generated by the marking processor 125 on image data of a common element. The resulting image data is supplied to the print engine 130. Instead of or in addition to the halftone processor 127, a functional module that performs another type of image processing, for example, gamma correction, may be provided in the processing circuit 124.

Each processing circuit 124 is a processor or an integrated circuit, such as a central processing unit (CPU), microprocessor, an application specific integrated circuit (ASIC), or a dynamically reconfigurable processor (DRP). If the processing circuit 124 is an ASIC, it contains circuits that function as the marking processor 125, the overlay processor 126, and the halftone processor 127. The DRP is a processor that can dynamically (for example, within one clock) change the configuration of an internal logic circuit. If the processing circuit 124 is formed by a DRP, the circuit configuration of the DRP is sequentially switched among circuits that function as the marking processor 125, the overlay processor 126, and the halftone processor 127.

In the cache memory 123, data of a common element that is repeatedly utilized in common for plural portions (e.g., plural different pages) of print data is stored. The stored data of the common element may be intermediate data, raster image data obtained by processing the intermediate data in the marking processor 125, or halftone image data obtained by processing the raster image data by the halftone processor 127. The type of format in which common element data is stored in the cache memory 123 may be determined in advance in accordance with the designing of the print system 100, or may be set as setting information that can be changed.

The cache memory 123 is used by all the plural processing circuits 124. Accordingly, all the plural processing circuits 124 reuse the common element data stored in the single cache memory 123.

The print engine 130 prints on paper raster image data subjected to halftone processing and supplied from each processing circuit 124 of the backend apparatus 120.

Each frontend apparatus 110 or the backend apparatus 120 may be formed as one blade (or one board) in a blade server. The interpreter 112 and the intermediate data generator 114 of the frontend apparatus 110 may be implemented as a program executed by a CPU mounted on a blade. Alternatively, plural pairs of the interpreters 112 and the intermediate data generators 114 may be executed on the CPU mounted on a blade as different processors or threads. In this case, plural frontend apparatuses 110 are included on one blade. If the CPU on a blade is a multi-core CPU, or if plural CPUs are formed on a blade, each frontend apparatus 110 may be formed by a corresponding core forming the multi-core CPU or a corresponding CPU. Some of the functions of the frontend apparatus 110 may be realized using an ASIC or another type of hardware circuit. Each processing circuit 124 or the cache memory 123 of the backend apparatus 120 is implemented as a hardware circuit, such as an ASIC, a DRP, or a semiconductor memory device. The distributor 121 may be implemented as a program or a hardware circuit.

As described above, in the print system 100 shown in FIG. 1, processing for converting a PDL print data into raster image data is performed in two steps by using two types of apparatuses, i.e., the frontend apparatuses 110 and the backend apparatus 120. In the first step, the plural frontend apparatuses 110 perform this conversion processing in parallel, while in the second step, the plural processing circuits 124 disposed in the backend apparatus 120 perform this conversion processing in parallel. All the plural processing circuits 124 use the cache memory 123 in the backend apparatus 120.

Figure 2:
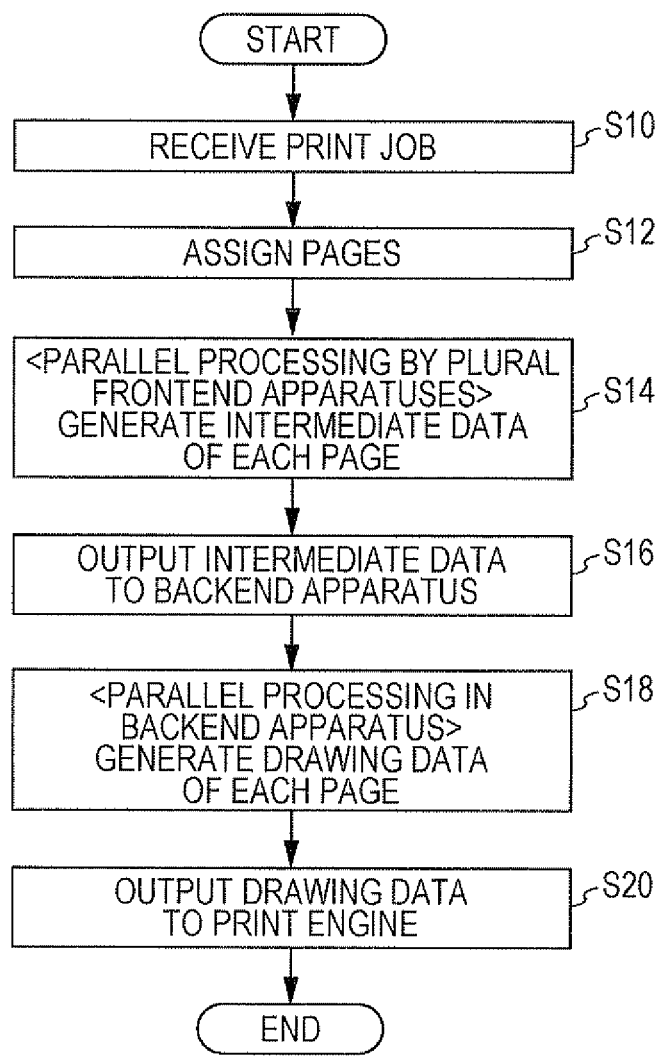
FIG. 2 is a flowchart illustrating an example of processing performed by the print system.

An example of the operation performed by the print system 100 shown in FIG. 1 will now be described with reference to the flowchart of FIG. 2. In FIG. 2, steps S10 and S12 are executed by the assignment controller 150, steps S14 and S16 are executed by the frontend apparatuses 110, and steps S18 and S20 are executed by the backend apparatus 120.

In step S10, the assignment controller 150 receives a print job (print instruction data including print data described in a PDL) from the client apparatus 200.

Then, in step S12, the assignment controller 150 determines, in a fixed order or in accordance with the operating statuses of the frontend apparatuses 110, which processing tasks of the pages of the PDL print data included in the print job received in step S10 are assigned to the frontend apparatuses 110. That is, the assignment controller 150 assigns a page to each frontend apparatus 110. The pages assigned to the frontend apparatuses 110 may be hereinafter referred to as the "assigned pages".

In step S14, each frontend apparatus 110 obtains the PDL print data to be processed, together with information concerning a page assigned to that frontend apparatus 110 in step S12. Then, the frontend apparatus 110 interprets the PDL print data so as to specify the assigned page, and then interprets the assigned page so as to generate intermediate data. The intermediate data to be generated in step S14 may be data which is separated in accordance with each of the basic colors Y, M, C, and K. In step S14, the plural frontend apparatuses 110 perform parallel processing in units of pages.

In step S16, each frontend apparatus 110 outputs the generated intermediate data to the backend apparatus 120. The distributor 121 of the backend apparatus 120 distributes the received elements of intermediate data over the processing circuits 124 in accordance with a predetermined unit of processing.

In step S18, each processing circuit 124 processes the intermediate data obtained from the distributor 121 so as to generate drawing data (raster image data) of the assigned intermediate data. The marking processor 125 of the processing circuit 124 performs drawing processing on the obtained intermediate data so as to determine the pixel values of the pixels forming a print image, thereby generating raster image data. The halftone processor 127 performs halftone processing on the generated raster image data (and may further perform gamma correction). If a common element, such as a form, is included in the distributed data, the overlay processor 126 superposes or composites the image of the elements other than the common element on or with the image of the common element.

In step S20, the raster image data subjected to halftone processing output from each processing circuit 124 is output to the print engine 130. A buffer memory may be disposed between the plural processing circuits 124 and the print engine 130 so as to absorb a difference between the processing speed of the processing circuits 124 and that of the print engine 130.

Figure 3:
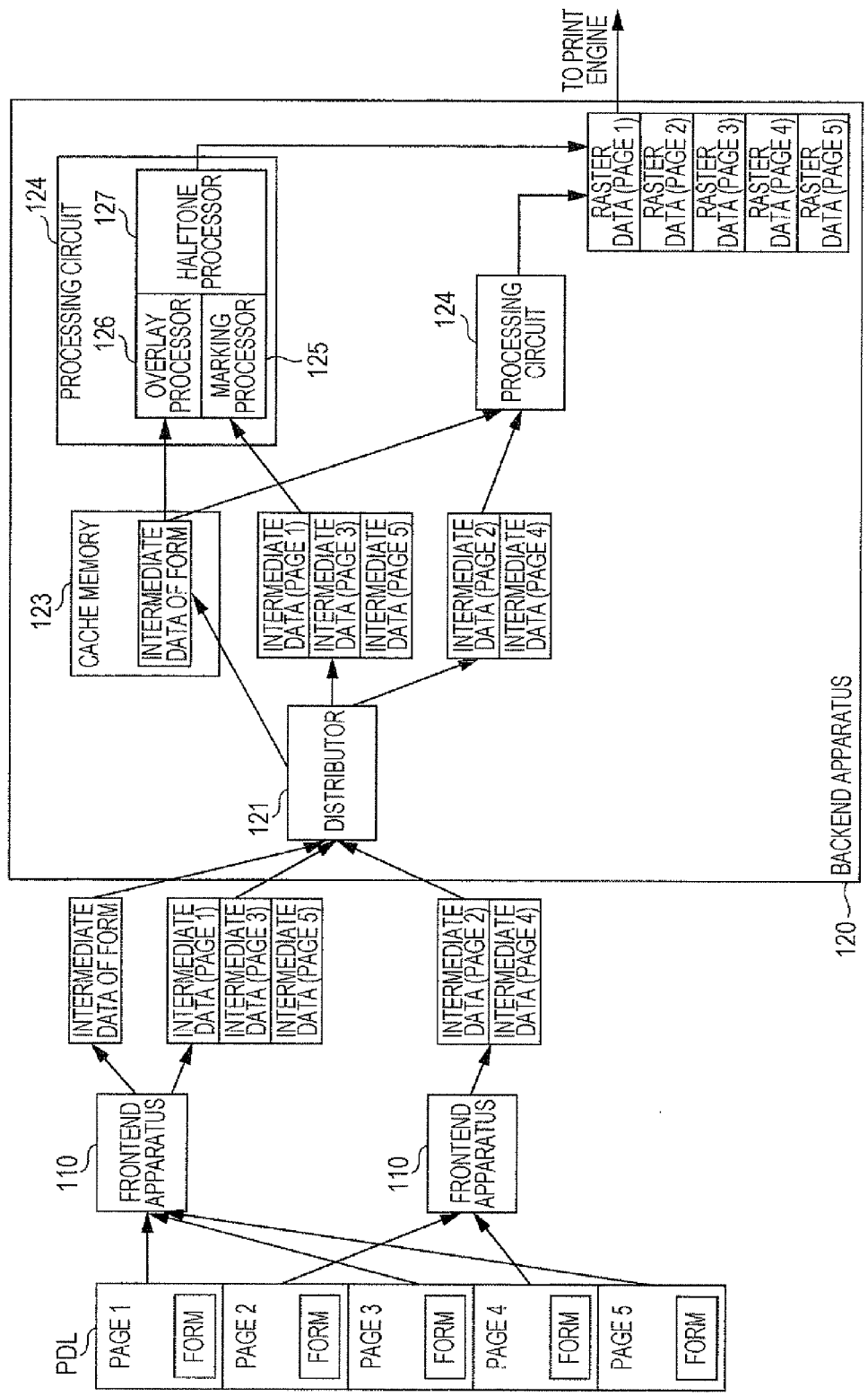
FIG. 3 illustrates an example of data processing performed by frontend apparatuses and a backend apparatus.

FIG. 3 illustrates an example of data processing performed by the frontend apparatuses 110 and the backend apparatus 120 in accordance with an example of this exemplary embodiment. In the example shown in FIG. 3, PDL print data including a document containing five pages (Page 1 through Page 5) and containing a form, which is a common element for all the pages, in each page is processed. In this example, the form contained in all the pages is the same form. In the example shown in FIG. 3, two front end apparatuses 110 sequentially process Page 1 through Page 5 one by one. More specifically, the first frontend apparatus 110 (apparatus shown in the upper portion of FIG. 3) processes Pages 1, 3, and 5, while the second frontend apparatus 110 (apparatus shown in the lower portion of FIG. 3) processes Pages 2 and 4. Each frontend apparatus 110 interprets the PDL print data so as to specify the assigned pages and the form contained in the assigned pages.

In the example shown in FIG. 3, intermediate data of a form is generated by one frontend apparatus 110 on behalf of the other frontend apparatus 110. For example, conditions concerning the assignment of the generation of intermediate data of a form to a particular frontend apparatus 110 may be stored in advance in each frontend apparatus 110, and each frontend apparatus 110 may determine whether that particular frontend apparatus 110 is to generate intermediate data of the form in accordance with the conditions. The conditions may be "generating intermediate data of a form if a processing task of the page in which the form appears for the first time is assigned to the frontend apparatus 110". In accordance with such conditions, if the frontend apparatus 110 first detects a certain form while sequentially interpreting PDL print data from the head and if the page including that form is assigned to the frontend apparatus 110, the frontend apparatus 110 generates intermediate data of the form. Even if the frontend apparatus 110 detects a form while interpreting PDL print data, the frontend apparatus 110 does not generate intermediate data of the form if the same form has already been detected before or if the page including the form is not assigned to the frontend apparatus 110. This approach to generating intermediate data is employed when print data is described in a page-dependent PDL, such as Postscript (registered).

The frontend apparatus 110 may generate drawing data from the intermediate data of the form and output the generated drawing data to the backend apparatus 120. In this case, the backend apparatus 120 stores the drawing data in the cache memory 123.

As another approach to assigning the generation of intermediate data to the frontend apparatuses 110, the assignment controller 150 may determine the frontend apparatus 110 that generates intermediate data of a form, and may send such information to that frontend apparatus 110. In this case, the frontend apparatus 110 that has received such information generates intermediate data of the form, and the frontend apparatus 110 that has not received such information does not generate intermediate data of the form.

Figure 4:
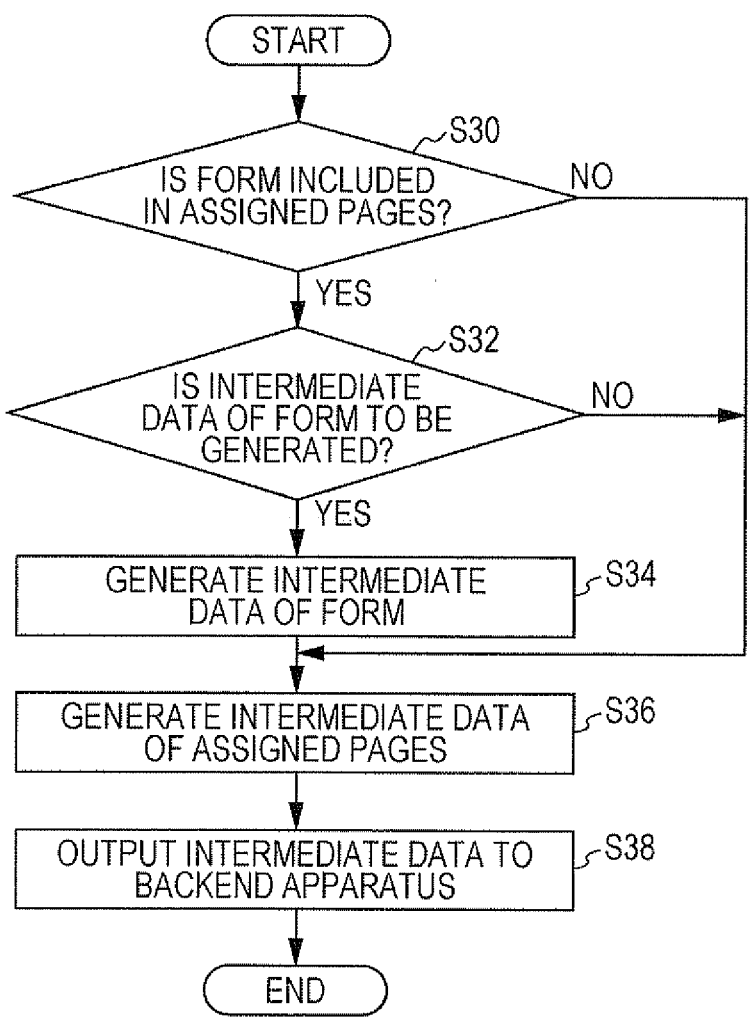
FIG. 4 is a flowchart illustrating an example of processing performed by each frontend apparatus.

FIG. 4 is a flowchart illustrating an example of the processing performed by each frontend apparatus 110 in the example shown in FIG. 3. The frontend apparatus 110 starts processing shown in FIG. 4 when receiving information concerning the assignment of pages to the frontend apparatus 110 from the assignment controller 150 and when obtaining PDL print data to be processed. In step S30, the interpreter 112 of the frontend apparatus 110 interprets the PDL print data so as to specify pages assigned to the frontend apparatus 110 and determines whether a form is contained in the assigned pages.

If it is determined in step S30 that a form is contained in the assigned pages, the process proceeds to step S32 to determine whether the frontend apparatus 110 is to generate intermediate data of the form. The determination in step S32 is made by predefined conditions. If conditions such as "generating intermediate data of a form if a processing task of the page in which the form appears for the first time is assigned to the frontend apparatus 110" have been defined, the frontend apparatus 110 determines from the results of interpreting the PDL print data whether the assigned pages include the page in which the form appears for the first time. If the assigned pages include the corresponding page, the above-described conditions are satisfied. Accordingly, the result of step S32 is YES, and in step S34, the intermediate data generator 114 generates intermediate data of the form on the basis of the results of interpretations made by the interpreter 112. In this case, intermediate data which is separated in accordance with each of the basic colors Y, M, C, and K may be generated. If the assigned pages do not include the page in which the form appears for the first time, the result of step S32 is NO. Accordingly, the process proceeds to step S36 by skipping step S34. If the assignment controller 150 determines the frontend apparatus 110 that is to generate intermediate data of the form and sends such information to the frontend apparatus 110, the determination of step S32 is made by determining whether such information has been received from the assignment controller 150. If such information has been received from the assignment controller 150, the result of step S32 is YES. Accordingly, in step S34, intermediate data of the form is generated. If such information has not been received, the result of step S32 is NO, and the process proceeds to step S36 by skipping step S34.

In step S36, the interpreter 112 and the intermediate data generator 114 generate intermediate data of the assigned pages (e.g., intermediate data separated in accordance with each of the basic colors Y, M, C, and K). In step S36, regardless of whether the assigned pages contain the form, intermediate data of objects other than the form in the assigned pages is generated. The intermediate data generated in step S36 further includes information regarding whether the form is contained in the pages corresponding to the elements of the generated intermediate data.

In step S38, the elements of the generated intermediate data of the assigned pages are output from the frontend apparatus 110 to the backend apparatus 120. If not only the intermediate data of the assigned pages, but also intermediate data of the form has been generated by the frontend apparatus 110 in step S34, the intermediate data of the form is also output to the backend apparatus 120 in step S38.

In the process shown in FIG. 4, only the frontend apparatus 110 to which the generation of intermediate data of a form is assigned generates intermediate data of the form and intermediate data of the assigned pages, and the other frontend apparatus 110 generates only intermediate data of the assigned pages, as in the example shown in FIG. 3.

The example of the processing performed by the frontend apparatus 110 has been described above.

Referring back to FIG. 3, in this example, the first frontend apparatus 110 assigned to Page 1 in which the common form used for all the pages (Page 1 through Page 5) appears for the first time generates intermediate data of that form. The first frontend apparatus 110 also generates intermediate data of elements (objects) other than the form in the assigned pages, i.e., Pages 1, 3, and 5. The second frontend apparatus 110 generates intermediate data of elements (objects) other than the form in the assigned pages, i.e., Pages 2 and 4. The generated plural elements of intermediate data are collected in the distributor 121 of the backend apparatus 120 via the transmission channel 140.

The distributor 121 stores the received intermediate data of the form in the cache memory 123, and also distributes the elements of the intermediate data of the individual pages over the two processing circuits 124. In this example, the pages are alternately distributed, and more specifically, the first processing circuit 124 (circuit shown in the upper portion of FIG. 3) receives and processes Pages, 1, 3, and 5, while the second processing circuit 124 (circuit shown in the lower portion of FIG. 3) receives and processes Pages 2 and 4. More specifically, the marking processor 125 of each processing circuit 124 receives the intermediate data of the form from the cache memory 123 and draws the intermediate data of the form so as to write the resulting image data into a buffer memory. The marking processor 125 also draws the intermediate data of the assigned pages. The drawing data obtained by the marking processor 125 is superposed on the image of the form stored in the buffer memory. Hereinafter, such processing may be called as "form overlay processing". The overlay (superposed) drawing data is subjected to halftone processing in the halftone processor 127. In this manner, individual elements of overlay (superposed) drawing data which have been generated alternately by the first and second processing circuits 124 in accordance with the assigned pages are sent to the print engine 130 via a buffer, etc., and are printed.

Figure 5:
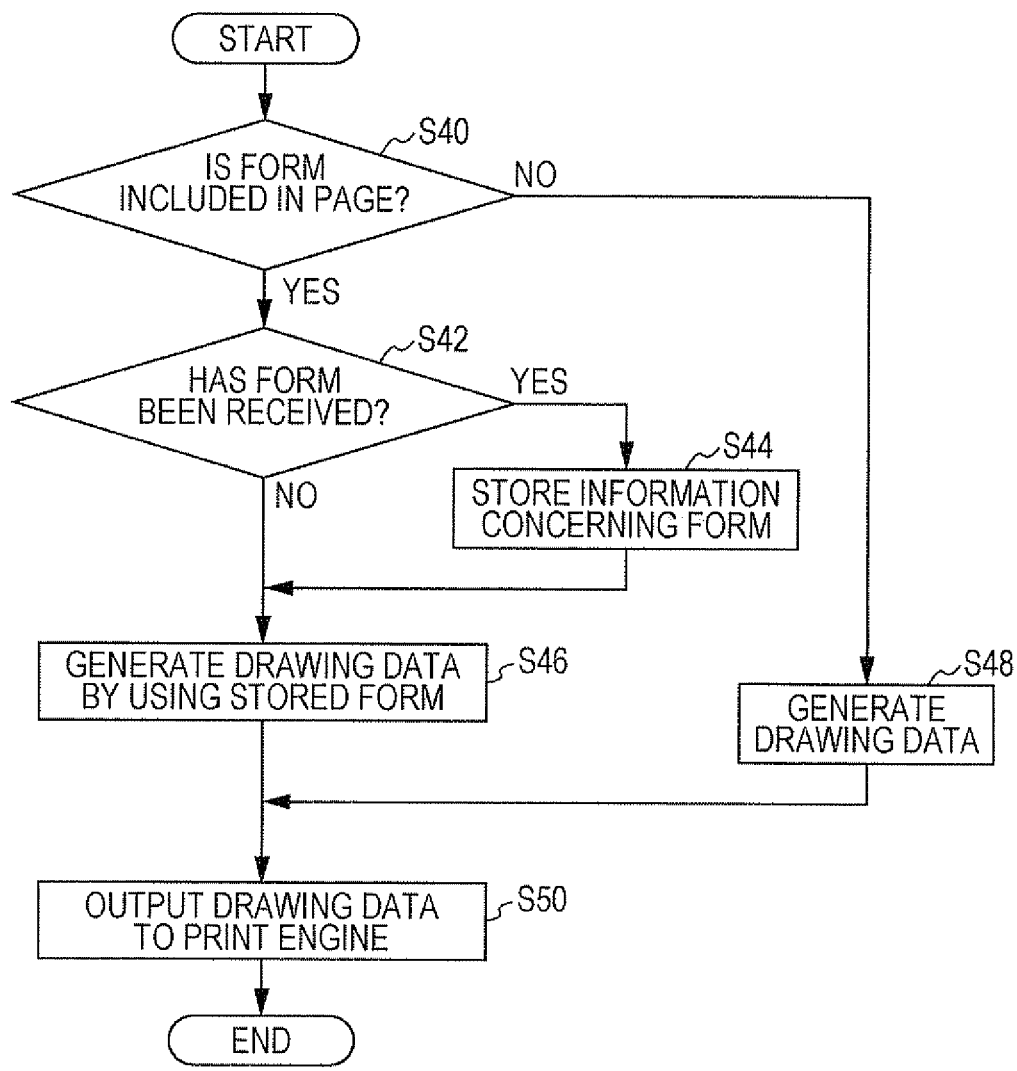
FIG. 5 is a flowchart illustrating an example of processing performed by a backend apparatus.

FIG. 5 is a flowchart illustrating processing performed by the backend apparatus 120 in an example of this exemplary embodiment. The backend apparatus 120 starts the processing shown in FIG. 5 when obtaining intermediate data output from each frontend apparatus 110.

In step S40, the distributor 121 of the backend apparatus 120 determines whether it is necessary to perform form overlay processing on the obtained intermediated data of a certain page. In this example, the intermediate data of each page includes information regarding whether form overlay processing is required. If the result of step S40 is YES, the process proceeds to step S42 to determine whether intermediate data of a form has been received.

If the result of step S42 is YES, the process proceeds to step S44. In step S44, the distributor 121 stores the received intermediate data of the form in the cache memory 123. The process then proceeds to step S46. If it is determined in step S42 that intermediate data of a form has not been received, the process proceeds to step S46 by skipping step S44.

In step S46, the distributor 121 delivers the intermediate data of the corresponding page to the corresponding processing circuit 124. Then, the marking processor 125 of the processing circuit 124 generates drawing data from the intermediate data of the page. This page contains an instruction to perform form overlay processing. Accordingly, the overlay processor 126 obtains the intermediate data of the form from the cache memory 123 and causes the marking processor 125 to generate drawing data of the form from the intermediate data, and superposes the drawing data of the page on the generated drawing data of the form. The form may be disposed at the bottommost position of a print image as a background image, or conversely, may be disposed at the topmost position of the print image. The position of the form is described in a PDL, and may be contained in the intermediate data of the form.

In step S50, upon finishing the generation of the drawing data, the generated elements of drawing data are sequentially output to the print engine 130.

If it is determined in step S40 that intermediate data of the form is not included in the intermediate data of the corresponding page, the process proceeds to step S48. In step S48, the marking processor 125 generates drawing data from the intermediate data of the corresponding page, and the halftone processor 127 further performs halftone processing on the generated drawing data. Then, in step S50, the resulting drawing data is output to the print engine 130.

Another example of data processing performed by the frontend apparatuses 110 and the backend apparatus 120 will now be discussed with reference to FIG. 6. In the example shown in FIG. 3, intermediate data of a form is stored in the cache memory 123 of the backend apparatus 120. In contrast, in the example shown in FIG. 6, raster data (drawing data) of a form is stored in the cache memory 123.

The distributor 121 of the backend apparatus 120 distributes intermediate data of a form received from the frontend apparatus 110 to one of the processing circuits 124 (e.g., the processing circuit 124 to which a processing task of intermediate data of a page received together with the form is assigned). In the processing circuit 124 that has received the intermediate data of the form, the marking processor 125 performs drawing processing on the intermediate data so as to generate raster data (drawing data) of the form, and stores the generated raster data in the cache memory 123. As described above, if drawing data of a form is generated in the frontend apparatus 110, the backend apparatus 120 directly stores the drawing data of the form received from the frontend apparatus 110. When processing intermediate data of a page distributed by the distributor 121, each processing circuit 124 obtains the raster data of the form from the cache memory 123 and writes the raster data into a buffer memory, and then superposes the raster data generated from the intermediate data of the corresponding page on the raster data obtained from the cache memory 123 (form overlay processing). Then, the superposed (overlay) raster data is processed in the halftone processor 127 and is then sent to the print engine 130.

Figure 6:
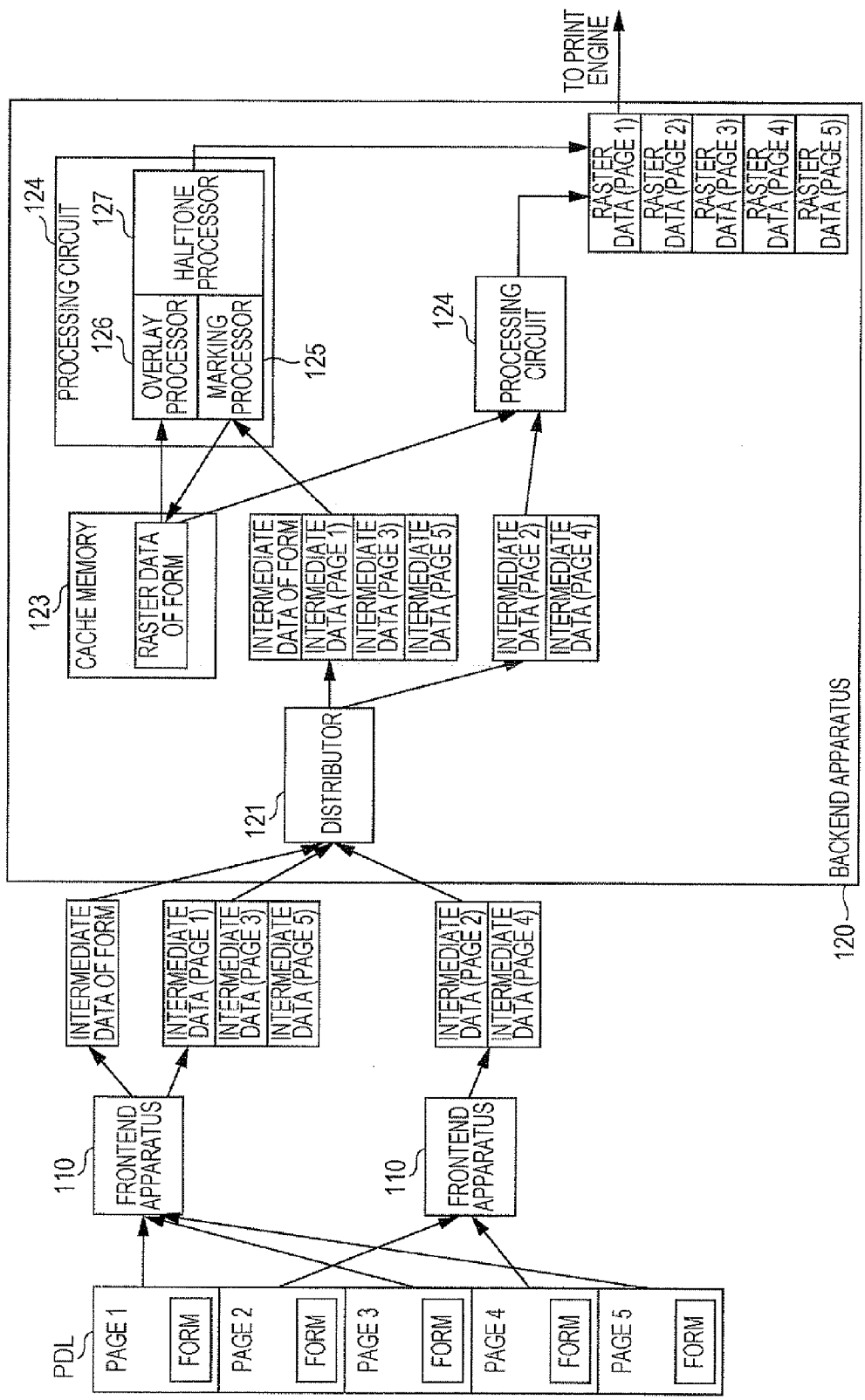
FIG. 6 illustrates another example of data processing performed by frontend apparatuses and a backend apparatus.

The processing shown in FIG. 6 other than the above-described point is similar to that shown in FIG. 3.

In the example shown in FIG. 6, the raster data of the form generated by the marking processor 125 is stored in the cache memory 123. Alternatively, the raster data generated by the marking processor 125 may be processed by the halftone processor 127, and the resulting data may be stored in the cache memory 123. Alternatively, drawing data of the form subjected to halftone processing may be generated in the frontend apparatus 110 and may be sent to the backend apparatus 120 and stored in the cache memory 123. Then, the drawing data stored in the cache memory 123 may be reused. In this case, the overlay processor 126 superposes data obtained by processing the raster data of a corresponding page by the halftone processor 127 on the raster data obtained from the cache memory 123 (form overlay processing).

Similarly, raster data of a form subjected to gamma correction may be stored in the cache memory 123, and the raster data of a corresponding page subjected to gamma correction may be superposed on the raster data of the form obtained from the cache memory 123.

An example in which plural forms are used in one document will be described below with reference to FIG. 7. In the example shown in FIG. 7, two forms, i.e., form 1 and form 2, are used in a document including five pages (Page 1 through Page 5). More specifically, the form 1 is used in Pages 1, 4, and 5, while the form 2 is used in Pages 2 and 3. Those five pages are alternately assigned to two frontend apparatuses 110 one by one. More specifically, Pages 1, 3, and 5 are assigned to the first frontend apparatus 110 (apparatus shown in the upper portion in FIG. 7), while Pages 2 and 4 are assigned to the second frontend apparatus 110 (apparatus shown in the lower portion in FIG. 7).

Figure 7:
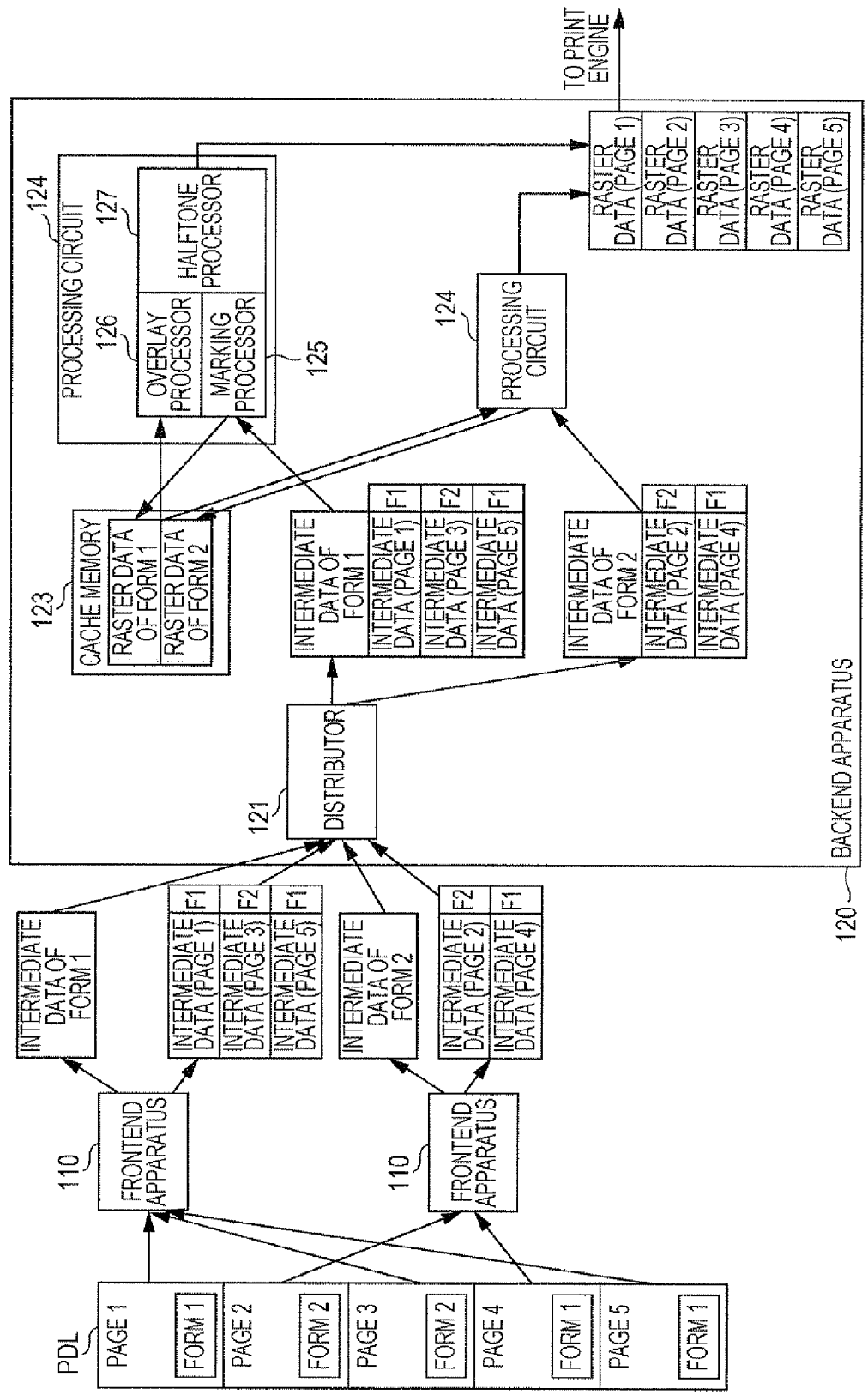
FIG. 7 illustrates still another example of data processing performed by frontend apparatuses and a backend apparatus.

In the example shown in FIG. 7, the first frontend apparatus 110 that processes Page 1, which is the page in which the form 1 appears for the first time, generates intermediate data of the form 1. The second frontend apparatus 110 that processes Page 2, which is the page in which the form 2 appears for the first time generates intermediate data of the form 2. The intermediate data of each page (other than the form) generated by the corresponding frontend apparatus 110 includes identification (ID) information F1 or F2 concerning the form contained in that page. F1 is ID information concerning the form 1, while F2 is ID information concerning the form 2. Plural elements of intermediate data of the individual forms and the individual pages generated by the frontend apparatuses 110 are collected in the backend apparatus 120.

The distributor 121 of the backend apparatus 120 distributes the intermediate data of the form 1 received together with the intermediate data of Page 1 over the first processing circuit 124. The first processing circuit 124 processes the intermediate data of the form 1 so as to generate raster data of the form 1 (or raster data subjected to halftone processing or gamma correction) and stores the generated raster data in the cache memory 123. The distributor 121 distributes the intermediate data of the form 2 received together with the intermediate data of Page 2 over the second processing circuit 124. The second processing circuit 124 processes the intermediate data of the form 2 so as to generate raster data of the form 2 (or raster data subjected to halftone processing or gamma correction) and stores the generated raster data in the cache memory 123.

Additionally, when processing the intermediate data of the corresponding page distributed by the distributor 121, each processing circuit 124 obtains raster data of the form corresponding to the ID information contained in the intermediate data from the cache memory 123 and writes the raster data into a buffer memory, and then superposes raster data generated from the intermediate data of the corresponding page on the raster data obtained from the cache memory 123 (form overlay processing). Then, the resulting raster data is processed in the halftone processor 127 and is then sent to the print engine 130.

Although in the example shown in FIG. 7 raster data of each form is stored in the cache memory 123, intermediate data of each form may be stored.

In the above-described examples, when processing drawing data of a form, the form is disposed at the bottommost (or topmost) position of a print image. In another example of this exemplary embodiment, when processing PDL print data of a document including a form, intermediate data including information concerning the hierarchical relationship between a form and other objects in a print image may be generated in each frontend apparatus 110, and drawing data reproducing this hierarchical information may be generated in the backend apparatus 120.

Figure 8:
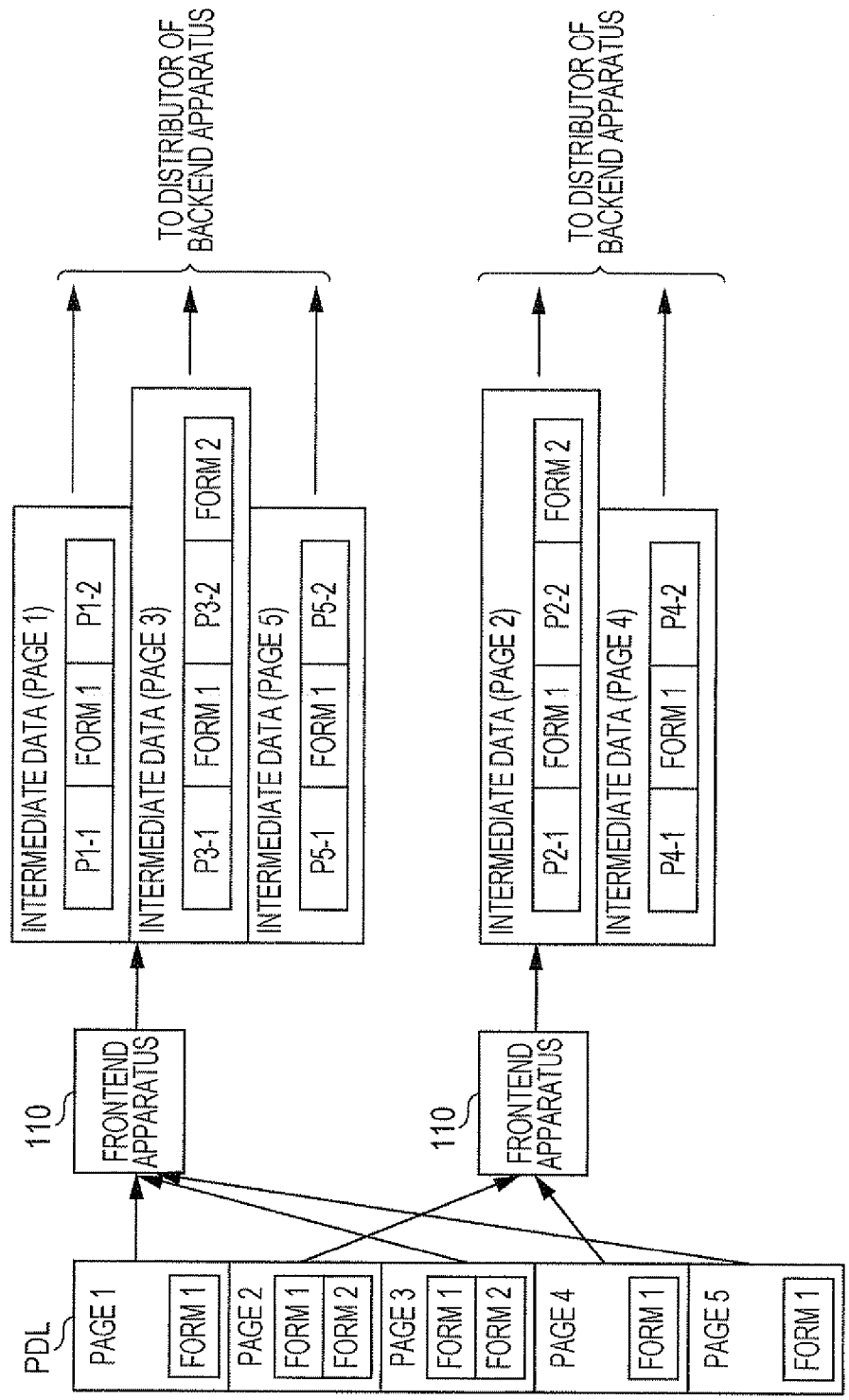
FIG. 8 illustrates an example of the configuration of intermediate data generated by frontend apparatuses in a modified example.

FIG. 8 illustrates an example of the configuration of intermediate data generated by each frontend apparatus 110 in the above-described example. PDL print data to be processed in the example shown in FIG. 8 is a document including five pages (Page 1 through Page 5). Form 1 is included in Pages 1, 4, and 5, while form 1 and form 2 are included in Pages 2 and 3. In this example, each frontend apparatus 110 generates intermediate data in which instructions to draw an object of a form and other objects of a page assigned to the frontend apparatus 110 are described in the order (from bottom to top or from top to bottom) in a print image. This is more specifically described with reference to intermediate data of the first page (Page 1) shown in FIG. 8. Symbol P1-1 is a drawing instruction (in the form of intermediate data) for an object disposed lower (or higher) than the form 1 in Page 1, form 1 is a drawing instruction (in the form of intermediate data) for the form 1, and symbol P1-2 is a drawing instruction (in the form of intermediate data) for an object disposed higher (or lower) than the form 1 in Page 1. Similarly, by referring to intermediate data of the second page (Page 2), objects represented by drawing instructions designated by P2-1, form 1, P2-2, and form 2 are disposed in this order from the top to the bottom (or from the bottom to the top). The configuration of intermediate data of the third page (Page 3) is similar to that of the intermediate data of the second page (Page 2), and the configurations of intermediate data of the fourth and fifth pages (Pages 4 and 5) are similar to the configuration of the intermediate data of the first page (Page 1). Those elements of intermediate data are output to the backend apparatus 120.

Figure 9:
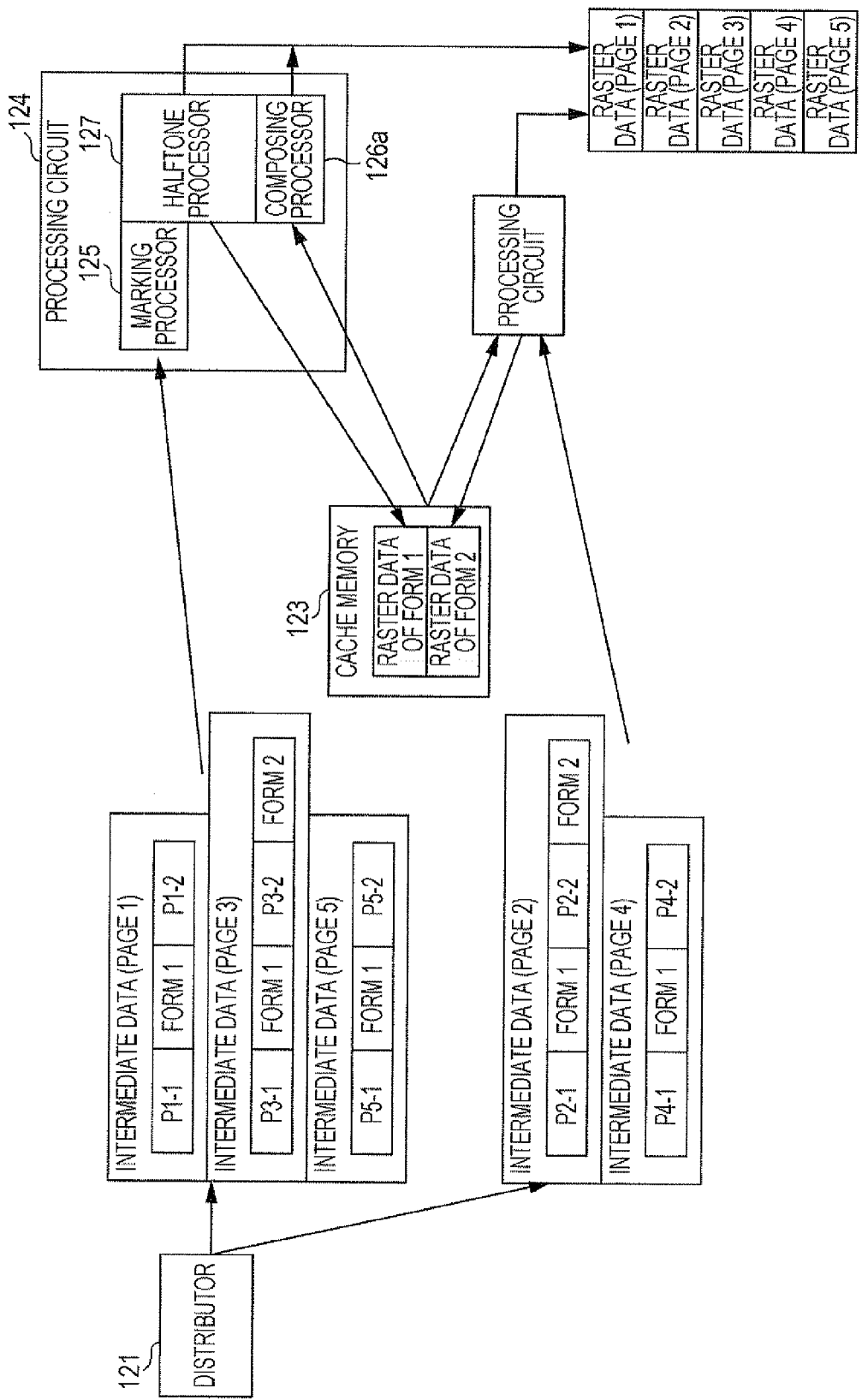
FIG. 9 illustrates an example of processing for intermediate data performed by a backend apparatus in a modified example.

Upon receiving elements of the intermediate data of the individual pages, the distributor 121 of the backend apparatus 120 alternately distributes, as shown in FIG. 9, the elements of the intermediate data of the individual pages over the two processing circuits 124.

In this example, upon receiving the intermediate data of Page 1, the first processing circuit 124 (circuit shown in the upper portion of FIG. 9) performs drawing processing on the intermediate data of each of the objects designated by P1-1, form 1, and P1-2 so as to generate drawing data. In this example, the page in which form 1 appears for the first time is Page 1, and thus, the first processing circuit 124 performs drawing processing on the form 1 on behalf of the second processing circuit 124. Then, the halftone processor 127 performs halftone processing on each element of the resulting drawing data (raster data) of those objects. The resulting data of the form 1 is stored in the cache memory 123. The marking processor 125 performs drawing processing on objects designated by P1-1 and P1-2 other than the form 1. A compositing processor 126a sequentially composites elements of the drawing data subjected to halftone processing of the individual objects in accordance with the hierarchical relationship of the elements P1-1, form 1, and P1-2 represented by the obtained intermediate data so as to generate drawing data subjected to compositing processing and halftone processing.

Upon receiving the intermediate data of Page 2, the second processing circuit 124 (circuit shown in the lower portion of FIG. 9) performs drawing processing on the intermediate data of each of the objects designated by P2-1, form 2, and P2-2 so as to generate drawing data. In this example, the page in which form 2 appears for the first time is Page 2, and thus, the second processing circuit 124 performs drawing processing on the form 2 on behalf of the first processing circuit 124. The page in which form 1 appears for the first time is not Page 2, but Page 1, and thus, the second processing circuit 124 does not perform drawing processing on the form 1. Then, the halftone processor 127 performs halftone processing on each element of the resulting drawing data (raster data) of those objects. The resulting data of the form 2 is stored in the cache memory 123. The marking processor 125 also performs drawing processing on objects designated by P2-1 and P2-2 other than the form 1. The compositing processor 126a sequentially composites elements of the drawing data subjected to halftone processing of the individual objects in accordance with the hierarchical relationship of the elements P2-1, form 1, P2-2, and form 2 represented by the obtained intermediate data so as to generate drawing data subjected to compositing processing and halftone processing. In this case, the drawing data subjected to halftone processing of the form 1, which has not been processed in the second processing circuit 124, is obtained from the cache memory 123 and is used.

When performing drawing processing on Pages 3, 4, and 5, the corresponding processing circuits 124 each obtain the drawing data subjected to halftone processing of the form 1 or form 2 from the cache memory 123, and composite the drawing data of the form 1 or form 2 with the drawing data of the objects other than the form 1 or form 2 in accordance with the hierarchical relationship represented by the obtained intermediate data of the corresponding page.

In the example shown in FIG. 9, elements of drawing data of forms are stored in the cache memory 123 after being subjected to halftone processing. However, this is an example only. The data format of forms to be stored in the cache memory 123 may be any form, such as intermediate data, drawing data that has not been subjected to halftone processing, drawing data that has been subjected to gamma correction, or drawing data that has been subjected to halftone processing and gamma correction.

In the example shown in FIG. 8, the frontend apparatuses 110 generate intermediate data of all forms contained in the individual pages. However, this is an example only. Alternatively, intermediate data of each form may be drawn by one frontend apparatus 110 on behalf of the other front end apparatus 110. Such an example is shown in FIG. 10.

Figure 10:
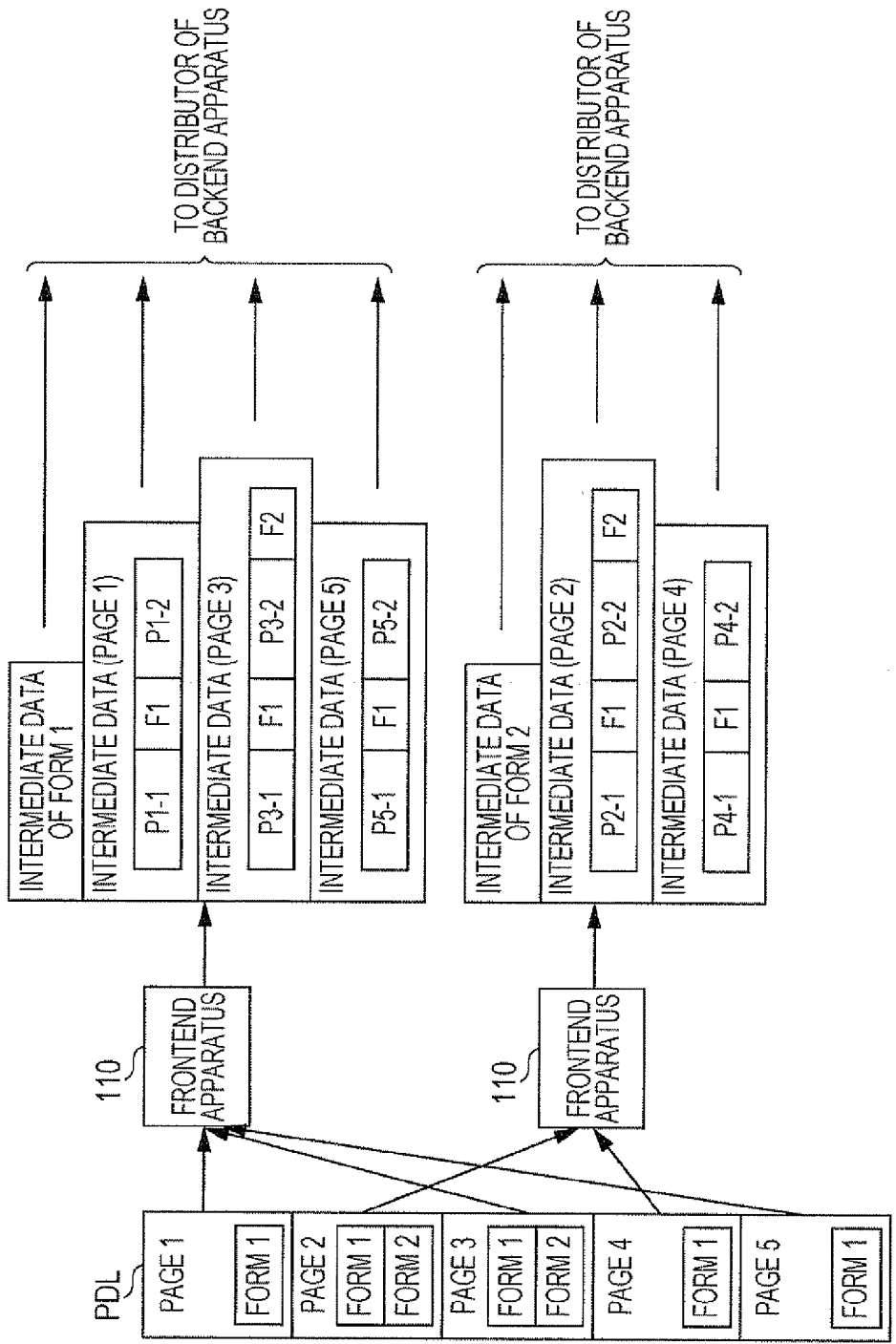
FIG. 10 illustrates another example of the configuration of intermediate data generated by frontend apparatuses in a modified example.

In the example shown in FIG. 10, PDL print data similar to that shown in FIG. 9 is processed. In the example shown in FIG. 10, each frontend apparatus 110 generates intermediate data of a form if the assigned pages include the page in which the form appears for the first time. That is, on behalf of the second frontend apparatus 110, the first frontend apparatus 110 generates intermediate data of the form 1 which appears in Page 1 for the first time. Similarly, on behalf of the first frontend apparatus 110, the second frontend apparatus 110 generates intermediate data of the form 2 which appears in Page 2 for the first time. Each frontend apparatus 110 generates the intermediate data of the objects other than the form contained in each page assigned to the frontend apparatus 110, and also generates intermediate data of the entire page including the intermediate data of the objects and ID information (F1 or F2) concerning the form contained in that page. F1 is ID information concerning the form 1, while F2 is ID information concerning the form 2. The intermediate data of the entire page includes information concerning the hierarchical relationship between the form and the objects other than the form. In this manner, the intermediate data of each page does not include intermediate data of a form itself. The intermediate data of each page and the intermediate data of each form are delivered to the backend apparatus 120. The hierarchical relationship between the form and the other objects of each page is similar to that shown in FIG. 8.

Although it is not shown in FIG. 10, in the backend apparatus 120, as in the example shown in FIG. 9, each processing circuit 124 performs drawing processing on the form 1 or the form 2 (or performs halftone processing or gamma correction) and stores the processing result in the cache memory 123. When processing the intermediate data of each page, each processing apparatus 124 reads ID information concerning the form contained in the intermediate data and composites, in the order in accordance with the hierarchical relationship represented by the intermediate data, the drawing data (raster data) of the form corresponding to the ID information with the drawing data of the objects other than the form.

In the example shown in FIG. 10, as well as in the example shown in FIG. 9, the data format of forms to be stored in the cache memory 123 may be any form, such as intermediate data, drawing data that has not been subjected to halftone processing, drawing data that has been subjected to halftone processing, drawing data that has been subjected to gamma correction, or drawing data that has been subjected to halftone processing and gamma correction. The same applies to the above-described other examples.

The above-described various examples are not restricted to the above-described modes, and various modifications may be made. For example, in the above-described examples, the distributor 121 for distributing plural elements of intermediate data over the processing circuits 124 of the backend apparatus 120 is disposed within the backend apparatus 120. Alternatively, each frontend apparatus 110 may have a processing function similar to the distributor 121. In this case, the distributor 121 disposed within each frontend apparatus 110 assigns elements of the generated intermediate data of individual pages and the intermediate data of a form to the processing circuits 124 in accordance with predetermined rules (for example, sequentially assigning the elements of the intermediate data to the plural processing circuits 124 in the order of pages). In this case, the distributor 121 of each frontend apparatus 110 may add ID information concerning the processing circuit 124 to which a processing task of the intermediate data of each page or each form is to be assigned. Upon receiving plural elements of intermediate data sent from each frontend apparatus 110, each processing apparatus 124 identifies and processes an element of the intermediate data including the ID information concerning the processing apparatus 124.

Alternatively, the distributor 121 may be provided separately from the frontend apparatuses 110 or the backend apparatus 120. In this case, each frontend apparatus 110 sends elements of generated intermediate data to the distributor 121. The distributor 121 determines to which processing circuit 124 of the backend apparatus 120 each of the received elements of intermediate data is to be assigned. For example, the distributor 121 adds ID information concerning the determined processing circuit 124 to each element of intermediate data and sends the elements of the intermediate data to the backend apparatus 120. Upon receiving plural elements of intermediate data from the distributor 121, each processing circuit 124 identifies and processes an element of intermediate data including the ID information concerning the processing circuit 124.

In the above-described examples, only one backend apparatus 120 is provided. However, plural backend apparatuses 120 may be provided, on the condition that the number of backend apparatuses 120 disposed in parallel is to be smaller than that of the frontend apparatuses 110. Each backend apparatus 120 is formed as, for example, one blade in a blade server. In this case, each backend apparatus 120 has its own cache memory 123, and each processing circuit 124 can access the cache memory 123 provided in the backend apparatus 120 to which the processing circuit 124 belongs, however, it cannot access the cache memory 123 of another backend apparatus 120. Thus, the frontend apparatus 110 that has generated intermediate data of a form sends the generated intermediate data to all the backend apparatuses 120 so that the data of the form can be stored in the cache memories 123 of all the backend apparatuses 120. In this case, since the number of backend apparatuses 120 to which elements of intermediate data of the individual pages are assigned is smaller than that of the frontend apparatuses 110, the number of pages assigned to each backend apparatus 120 is greater than that assigned to each frontend apparatuses 110. Accordingly, the frequency of the use of data of the form stored in the cache memories 123 of the backend apparatuses 120 is higher than that of a configuration in which the number of backend apparatuses 120 is the same as the number of frontend apparatuses 110 or a configuration in which known RIPs, each of which is not divided into a frontend and a backend, are disposed in parallel and a cache memory is provided for each RIP. That is, the efficiency of the use of the cache memories 123 is high. In this case, only one processing circuit 124 may be provided in each backend apparatus 120, or plural processing circuits 124 may be provided in each backend apparatus 120.

If only one backend apparatus 120 is provided in the print system 100, the efficiency of the use of the cache memory 123 within the backend apparatus 120 is higher than that when plural backend apparatuses 120 are provided. Even if only one backend apparatus 120 is provided, plural hardware processing circuits 124 that can achieve fast processing are provided and perform parallel processing, thereby ensuring the processing speed of drawing processing in the entire system. Additionally, the processing circuits 124 within the backend apparatus 120 are connected to the single cache memory 123 via a fast bus or another fast communication medium disposed within the backend apparatus 120 so that all the processing circuits 124 can use the single cache memory 123.

In the above-described examples, four colors Y, M, C, and K are used as basic colors for printing. However, other colors may be used as basic colors, or five or more colors or three or less colors may be used as basic colors. In those cases, processing operations of the above-described examples of the exemplary embodiment may be implemented in a manner similar to those examples.

In the above-described examples, the marking processor 125 generates raster data as drawing data. However, instead of raster data, another format of print image data, such as run length data, may be generated as drawing data.

In the above-described examples, the processing circuits 124 of the backend apparatus 120 process intermediate data which has been generated in units of pages. However, the processing circuits 124 may process the intermediate data which has been generated in units of bands obtained by dividing each page. Alternatively, processing circuits 124 corresponding to the number of basic colors may be provided in the backend apparatus 120, and intermediate data received from each frontend apparatus 110 may be distributed over the corresponding processing circuits 124 in accordance with each of the basic colors. Alternatively, plural processing circuits 124 corresponding to each of basic colors may be provided in the backend apparatus 120, and elements of intermediate data of each of the basic colors may be distributed over the corresponding processing circuits 124 in units of pages or in another unit of processing.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing system comprising:
    a plurality of intermediate-data generating apparatuses;
        the plurality of intermediate-data generating apparatuses interpreting data of pages forming document data described in a page description language,
        the pages being assigned to the corresponding intermediate-data generating apparatuses, so as to generate a plurality of elements of intermediate data of the pages; and
    one or more drawing-data generating apparatuses;
        the one or more drawing-data generating apparatuses obtaining elements of the intermediate data assigned to each of the one or more drawing-data generating apparatuses,
            the elements of the intermediate data being obtained from the plurality of elements of intermediate data generated by the plurality of intermediate-data generating apparatuses, wherein
        the one or more drawing data generating apparatuses each draw the obtained elements of the intermediate data so as to generate drawing data,
            including information concerning each of pixels forming each of the obtained elements of the intermediate data,
        the one or more drawing-data generating apparatuses each including a memory that stores intermediate data of a common element used in the obtained elements of the intermediate data,
        or stores drawing data of the common element generated from the intermediate data of the common element, wherein
            if the intermediate data or the drawing data of the common element is stored in the memory,
                the one or more drawing-data generating apparatuses generate drawing data of the obtained elements of the intermediate data assigned to the one or more drawing-data generating apparatuses by using the intermediate data or the drawing data of the common element stored in the memory,
    wherein the number of the one or more drawing-data generating apparatuses is smaller than the number of the plurality of intermediate-data generating apparatuses,
    wherein the image processing system further comprises a plurality of intermediate-data generating apparatuses;
        the plurality of intermediate-data generating apparatuses interpreting data of pages forming document data described in a page description language,
        the pages being assigned to the corresponding intermediate-data generating apparatuses, so as to generate a plurality of elements of intermediate data of the pages, and wherein
            each of the plurality of intermediate-data generating apparatuses interprets data for every page of the document data, but only generates a respective portion of intermediate data corresponding to the respective portion of intermediate data assigned to the corresponding intermediate-data generating apparatus;
    one or more drawing-data generating apparatuses;
        the one or more drawing-data generating apparatuses obtaining elements of the intermediate data assigned to each of the one or more drawing-data generating apparatuses,
            the elements of the intermediate data being obtained from the plurality of elements of intermediate data generated by the plurality of intermediate-data generating apparatuses, wherein
        the one or more drawing data generating apparatuses each draw the obtained elements of the intermediate data so as to generate drawing data,
            including information concerning each of pixels forming each of the obtained elements of the intermediate data,
        the one or more drawing-data generating apparatuses each including a memory that stores intermediate data of a common element used in the obtained elements of the intermediate data,
        or stores drawing data of the common element generated from the intermediate data of the common element, wherein
            if the intermediate data or the drawing data of the common element is stored in the memory,
                the one or more drawing-data generating apparatuses generate drawing data of the obtained elements of the intermediate data assigned to the one or more drawing-data generating apparatuses by using the intermediate data or the drawing data of the common element stored in the memory,
    wherein the number of the one or more drawing-data generating apparatuses is smaller than the number of the plurality of intermediate-data generating apparatuses.

2. The image processing system according to claim 1, wherein at least one of the one or more drawing-data generating apparatuses includes:
    a plurality of drawing circuits, the plurality of drawing circuits drawing the elements of the intermediate data assigned to the at least one of the one or more drawing-data generating apparatuses so as to generate drawing data of the pages; and
    a distributor that distributes the elements of the intermediate data obtained by the at least one of the one or more drawing-data generating apparatuses over the plurality of drawing circuits.

3. The image processing system according to claim 2, wherein an intermediate-data generating apparatus of the plurality of intermediate-data generating apparatuses that satisfies preset conditions generates the intermediate data of the common element on behalf of the other intermediate-data generating apparatuses.

4. The image processing system according to claim 3, wherein the intermediate data further includes information regarding a hierarchical relationship between the common element and other elements in an image, and the one or more drawing-data generating apparatuses generate the drawing data in accordance with the information regarding the hierarchical relationship.

5. The image processing system according to claim 2, wherein the intermediate data further includes information regarding a hierarchical relationship between the common element and other elements in an image, and the one or more drawing-data generating apparatuses generate the drawing data in accordance with the information regarding the hierarchical relationship.

6. The image processing system according to claim 1, wherein at least one of the one or more drawing-data generating apparatuses includes:
a plurality of drawing circuits that draw the elements of the intermediate data assigned to the at least one of the one or more drawing-data generating apparatuses so as to generate drawing data of the pages,
wherein all the plurality of drawing circuits use the intermediate data or the drawing data of the common element stored in the memory.

7. The image processing system according to claim 6, wherein an intermediate-data generating apparatus of the plurality of intermediate-data generating apparatuses that satisfies preset conditions generates the intermediate data of the common element on behalf of the other intermediate-data generating apparatuses.

8. The image processing system according to claim 7, wherein the intermediate data further includes information regarding a hierarchical relationship between the common element and other elements in an image, and the one or more drawing-data generating apparatuses generate the drawing data in accordance with the information regarding the hierarchical relationship.

9. The image processing system according to claim 6, wherein the intermediate data further includes information regarding a hierarchical relationship between the common element and other elements in an image, and the one or more drawing-data generating apparatuses generate the drawing data in accordance with the information regarding the hierarchical relationship.

10. The image processing system according to claim 1, wherein an intermediate-data generating apparatus of the plurality of intermediate-data generating apparatuses that satisfies preset conditions generates the intermediate data of the common element on behalf of the other intermediate-data generating apparatuses.

11. The image processing system according to claim 10, wherein the intermediate data further includes information regarding a hierarchical relationship between the common element and other elements in an image, and the one or more drawing-data generating apparatuses generate the drawing data in accordance with the information regarding the hierarchical relationship.

12. The image processing system according to claim 1, wherein the intermediate data further includes information regarding a hierarchical relationship between the common element and other elements in an image, and the one or more drawing-data generating apparatuses generate the drawing data in accordance with the information concerning the hierarchical relationship.

13. The image processing system according to claim 1, wherein at least one of the one or more drawing-data generating apparatuses includes:
a plurality of drawing circuits, the plurality of drawing circuits drawing the elements of the intermediate data assigned to the at least one of the one or more drawing-data generating apparatuses so as to generate drawing data of the pages; and
a distributor that distributes the elements of the intermediate data obtained by the at least one of the one or more drawing-data generating apparatuses over the plurality of drawing circuits.

14. The image processing system according to claim 1, wherein an intermediate-data generating apparatus of the plurality of intermediate-data generating apparatuses that satisfies preset conditions generates the intermediate data of the common element on behalf of the other intermediate-data generating apparatuses.

15. The image processing system according to claim 1, wherein the intermediate data further includes information regarding a hierarchical relationship between the common element and other elements in an image, and the one or more drawing-data generating apparatuses generate the drawing data in accordance with the information concerning the hierarchical relationship.

16. An image processing method comprising:
generating a plurality of elements of intermediate data comprised of assigned pages, the assigned pages forming document data, the document data being described in a page description language by interpreting data from the pages; and
generating drawing data, including information regarding each of pixels forming each of the elements of the intermediate data of the assigned pages, the elements of the intermediate data being obtained from the plurality of elements of the generated intermediate data, by drawing the obtained elements of the intermediate data, a memory being provided to store intermediate data of a common element being used in the obtained elements of the intermediate data of the assigned pages or to store drawing data of the common element generated from the intermediate data of the common element, wherein if the intermediate data or the drawing data of the common element used in the elements of the intermediate data of the assigned pages is stored in the memory, the drawing data of the elements of the intermediate data of the assigned pages is generated by using the intermediate data or the drawing data of the common element stored in the memory,
wherein the image processing method further comprises
interpreting data of pages forming document data described in a page description language,
the pages being assigned to corresponding intermediate-data generating apparatuses, so as to generate a plurality of elements of intermediate data of the pages, and wherein
each of the plurality of intermediate-data generating apparatuses interprets data for every page of the document data, but only generates a respective portion of intermediate data corresponding to the respective portion of intermediate data assigned to the corresponding intermediate-data generating apparatus;
one or more drawing-data generating apparatuses;

the one or more drawing-data generating apparatuses obtaining elements of the intermediate data assigned to each of the one or more drawing-data generating apparatuses,
  the elements of the intermediate data being obtained from the plurality of elements of intermediate data generated by the plurality of intermediate-data generating apparatuses, wherein
the one or more drawing data generating apparatuses each draw the obtained elements of the intermediate data so as to generate drawing data,
  including information concerning each of pixels forming each of the obtained elements of the intermediate data,
the one or more drawing-data generating apparatuses each including a memory that stores intermediate data of a common element used in the obtained elements of the intermediate data, or stores drawing data of the common element generated from the intermediate data of the common element, wherein
  if the intermediate data or the drawing data of the common element is stored in the memory,
    the one or more drawing-data generating apparatuses generate drawing data of the obtained elements of the intermediate data assigned to the one or more drawing-data generating apparatuses by using the intermediate data or the drawing data of the common element stored in the memory,
wherein the number of the one or more drawing-data generating apparatuses is smaller than the number of the plurality of intermediate-data generating apparatuses.

* * * * *